United States Patent
Pettinger et al.

[15] 3,663,365
[45] May 16, 1972

[54] NUCLEAR REACTOR FUEL ELEMENT ASSEMBLIES

[72] Inventors: Donald Stanley Pettinger; John Mackinlay Yellowlees, both of Cheshire, England

[73] Assignee: The Nuclear Power Group Limited, Knutsford, Cheshire, England

[22] Filed: Oct. 28, 1968

[21] Appl. No.: 771,035

[30] Foreign Application Priority Data

Oct. 27, 1967 Great Britain......................49,011/67

[52] U.S. Cl..............................................................176/77
[51] Int. Cl.................................................................G21c 3/23
[58] Field of Search........................176/73, 74, 75, 76, 77, 78

[56] References Cited

UNITED STATES PATENTS

| 3,047,487 | 7/1962 | Cannon................................176/73 X |
| 3,133,000 | 5/1964 | Beavis......................................176/78 |
| 3,173,845 | 3/1965 | Ritz..........................................176/75 X |

FOREIGN PATENTS OR APPLICATIONS 870,263  6/1961  Great Britain............................176/78

Primary Examiner—Carl D. Quarforth
Assistant Examiner—Gary G. Solyst
Attorney—Holman & Stern

[57] ABSTRACT

A nuclear reactor fuel element assembly in which a plurality of sleeves arranged end to end house nuclear fuel-containing members arranged in clusters, wherein the ends of the fuel-containing members have cut-away portions or projections and the fuel-containing members of the groups are so disposed that gravitational forces due to the weight of the fuel-containing members of the group, when the assembly is located in a vertical channel in a reactor core, act to produce couples on the members causing them to lean at one end towards one another in mutually supporting relationship and to lean at the other end away from one another against fixed surfaces provided at least in part by the walls of the sleeves.

5 Claims, 4 Drawing Figures

Patented May 16, 1972

INVENTOR
DONALD STANLEY PETTINGER ET AL
BY

ATTORNEYS

NUCLEAR REACTOR FUEL ELEMENT ASSEMBLIES

This invention relates to nuclear reactor fuel element assemblies.

A known form of fuel element assembly used in high temperature gas-cooled, graphite-moderated reactors comprises a plurality of graphite sleeves arranged end to end and spigotted together to form a substantially continuous tube but capable of some degree of articulation at the joints between the sleeves.

Within the tube formed by the sleeves are located clusters of fuel-containing tubes. The arrangement is such that when the assembly is located in a vertical channel in the reactor core the sleeves support one another and so do the fuel containers of adjacent sleeves.

The fuel-containing tubes are usually located in an annular space formed between the graphite sleeves and a centrally located tubular member which may or may not contain nuclear fuel, the main purpose of the central member being to facilitate handling of the fuel element assembly when inserting the assembly in or removing it from the core.

Cooling gas flows through the tube formed by the graphite sleeves and over the surface of the fuel containing tubes which are in spaced relation to one another.

In reactors where the cooling gas is at high pressure, forces due to gas pressure can set up vibration in the fuel-containing tubes with the consequent danger of damage to the tubes and release of fission products.

Rigid clamping of the fuel containing tubes can lead to difficulties as allowances must be made for differential expansion and shrinkage due to irradiation, and the clamping must not be such as to reduce the articulation of the individual sleeves of the assembly.

The object of the present invention is to provide a nuclear reactor fuel element assembly in which vibration of the fuel containing members is eliminated or reduced to negligible proportions without having to resort to clamping of any sort.

The invention consists in a nuclear reactor fuel element assembly comprising a plurality of sleeves arranged end to end, said sleeves housing nuclear fuel-containing members arranged in two or more axially spaced clusters, wherein fuel-containing members of a cluster are supported, when in position in a vertical channel in the reactor, by fuel-containing members of a cluster immediately below it, the fuel-containing members of a cluster being arranged in one or more groups each group being associated with the fuel-containing members of a corresponding group of the cluster below, and wherein the ends of the fuel-containing members have cut-away portions or projections whereby for each pair of adjoining end faces, the end face of at least one of the fuel containing-members has a cut-away portion or projection such that a vertical line joining the center of gravity of one member to the adjoining end faces passes outside the area of contact between the two end faces, the fuel-containing members of the groups being so disposed that gravitational forces due to the weight of the fuel-containing members of the group, when the assembly is located in a vertical channel in a reactor core, act to produce couples on the members causing them to lean at one end towards one another in mutually supporting relationship and to lean at the other end away from one another against fixed surfaces provided at least in part by the walls of the sleeves, the couples acting on adjoining faces of fuel-containing members of corresponding groups in adjacent clusters acting to cause all the members of both groups either to lean together or lean away from one another at the adjoining faces.

In one embodiment of the invention the fuel-containing members are located in groups in an annular space formed between the sleeves and a centrally located member, those ends of the members of a group leaning away from one another being supported by the walls of the sleeves and being in mutually supporting relationship with fuel-containing members of other groups of the cluster via the centrally located member.

To prevent relative rotation between members of a group lugs may be formed on each member which engage recesses or lugs on adjacent members of the group. Where necessary the lugs may also abut surfaces or enter recesses formed on the sleeves and/or the centrally located member. The lugs may also act as spacing members between adjacent fuel-containing members of a cluster. The lugs may extend for the full length of the fuel containing members or extend only over the end portions thereof.

The invention also consists in a nuclear reactor fuel element assembly substantially as described herein with reference to the accompanying drawings in which.

Figure 1:
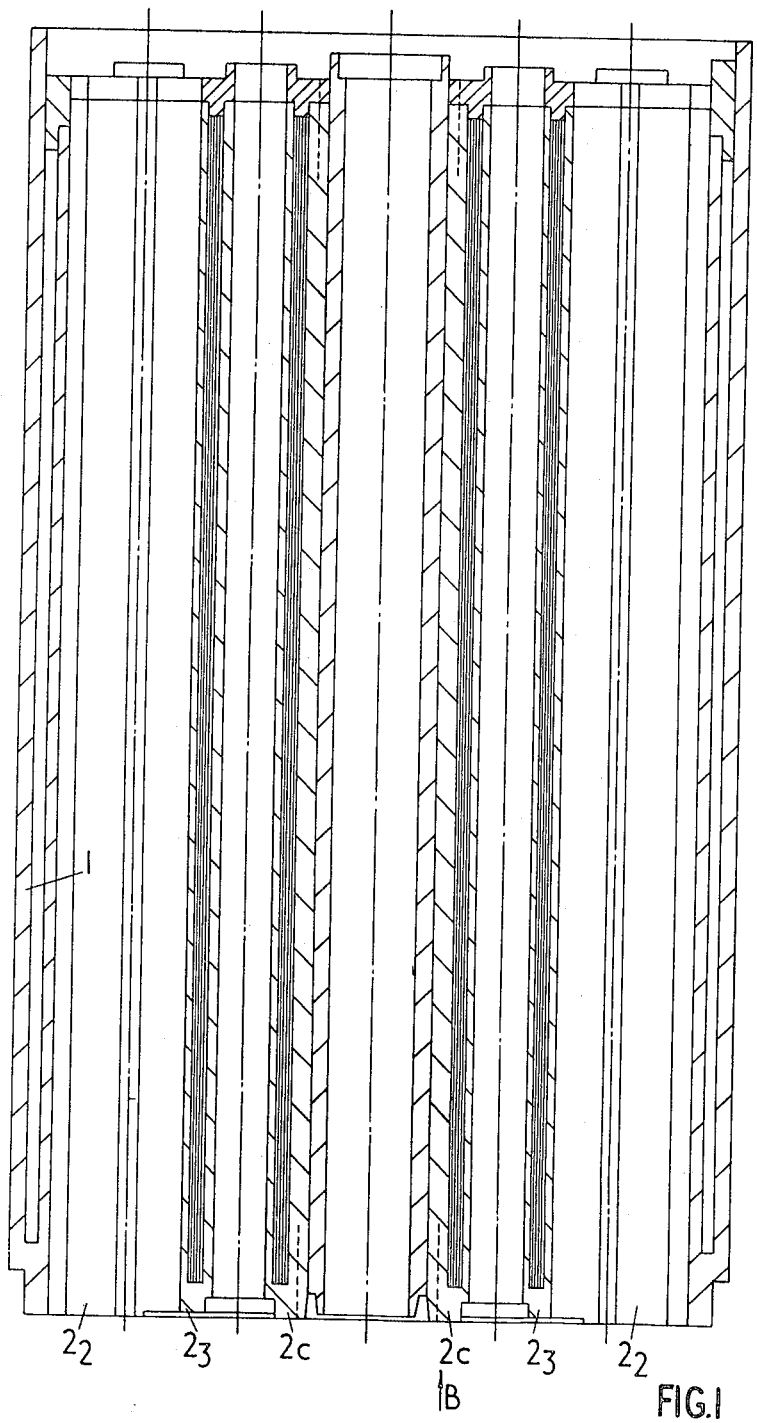
FIG. 1 is a longitudinal section through part of a nuclear fuel element assembly in accordance with one embodiment of the invention being a section on line AA of FIG. 2 which is an end view of the assembly shown in FIG. 1 looking in the direction of arrow B.
Figure 2:
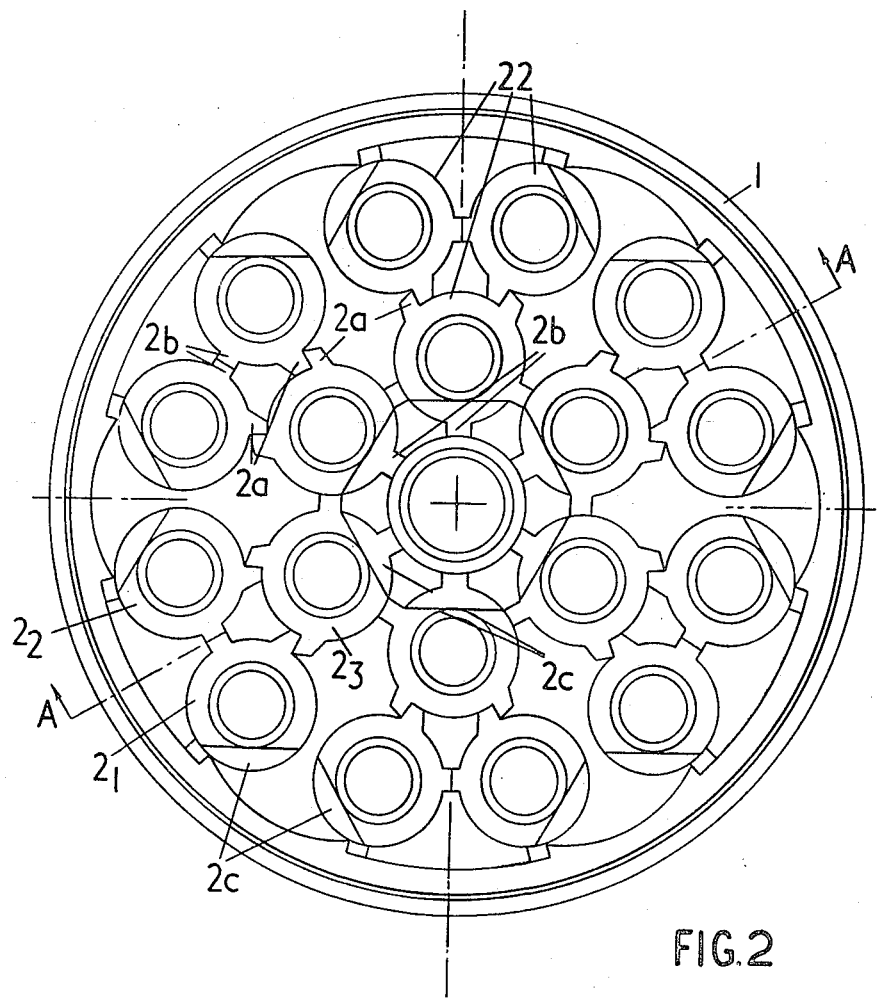

In carrying the invention into effect in one form by way of example and referring first of all to FIGS. 1 and 2 a nuclear fuel element assembly is built up of a number of graphite sleeves of the kind shown at 1. Each sleeve houses a cluster of nuclear fuel-containing members 2.

The members 2 are located in an annular space 3 formed between the sleeve 1 and a centrally located tubular member 4.

Figure 3:
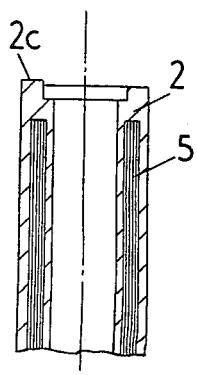
FIG. 3 is a section through one end of a nuclear fuel-containing member used in the assembly shown in FIGS. 1 and 2.

The members 2 are arranged in groups of three, a typical group being shown at $2_1$, $2_2$, and $2_3$. Each member comprises essentially a tube housing nuclear fuel. The fuel can be located inside the tube or within its walls as shown in FIG. 3 where the fuel is represented by reference numeral 5.

Each member 2 has lugs 2a which abut against corresponding lugs on adjacent members of the group in which it is located to prevent relative rotation of the members.

The members may also have additional lugs 2b which serve to space the member from a member of an adjacent group or central member 4 or which engage projections 1a on the wall of sleeve 1. The lugs 2a, 2b extend for the full axial length of members 2 or for short distances at the ends.

The lower end faces of the fuel-containing members 2, in the form shown, have cut-away portions or projections formed thereon which are off-set with respect to the central axes of the members. In the following description the term 'projection' is used and is indicated by the reference numeral 2c in each case. The shape of the cross-section of the projection can be seen from FIG. 2. Whilst in the form shown the upper end faces of the members do not carry off-set projections, such projections can be formed on the upper end faces if so desired.

The arrangement in accordance with the invention is best explained with reference to FIG. 4, in which is shown part of the annular channel formed between a stack of sleeves 1 in a fuel element assembly and a centrally located member 4 which may also consist of a number of tubular members arranged end to end as shown. The details of the joints between sleeves and tubular members have not been shown as they form no part of the present invention.

For the purpose of explanation, the elements $2_2$ and $2_3$ of each group are assumed to lie in the plane of the drawing but when the elements are in groups of three as shown in FIG. 2 it will be appreciated that this is not the case in practice. The members 2 in the second sleeve from the top of the drawing are disposed in the same manner as that shown in FIGS. 1 and 2. The projections 2c bear against flat end faces of adjacent members 2 in a corresponding group of members in the cluster of the sleeve below.

Considering first of all the two adjacent sleeves in the middle of the drawing, the gravitational forces due to the weights of the members in the upper of the two sleeves act along a vertical line passing through the centers of gravity of the members. This vertical line passes outside the area of contact between adjacent members and the result is to produce couples tending to cause the members to lean away from each other as shown in exaggerated form.

The lateral forces acting at the joints between the end faces of the members are taken up by the walls of the sleeves 1 and by members of an adjacent group (not shown) via the central member 4.

Considering now the upper pair of sleeves, the projections at the lower end of the members 2 in the uppermost sleeve are disposed so that the gravitational forces acting exert couples tending to make the members 2 lean against one another in mutually supporting relationship. Thus the fuel containing members of each group of a sleeve lean towards each other at one end and away from each other at the other. The disposition of the members and their respective projections is such that in adjacent sleeves the members of corresponding groups either all lean inward at their adjoining faces or all lean outwards.

Figure 4:
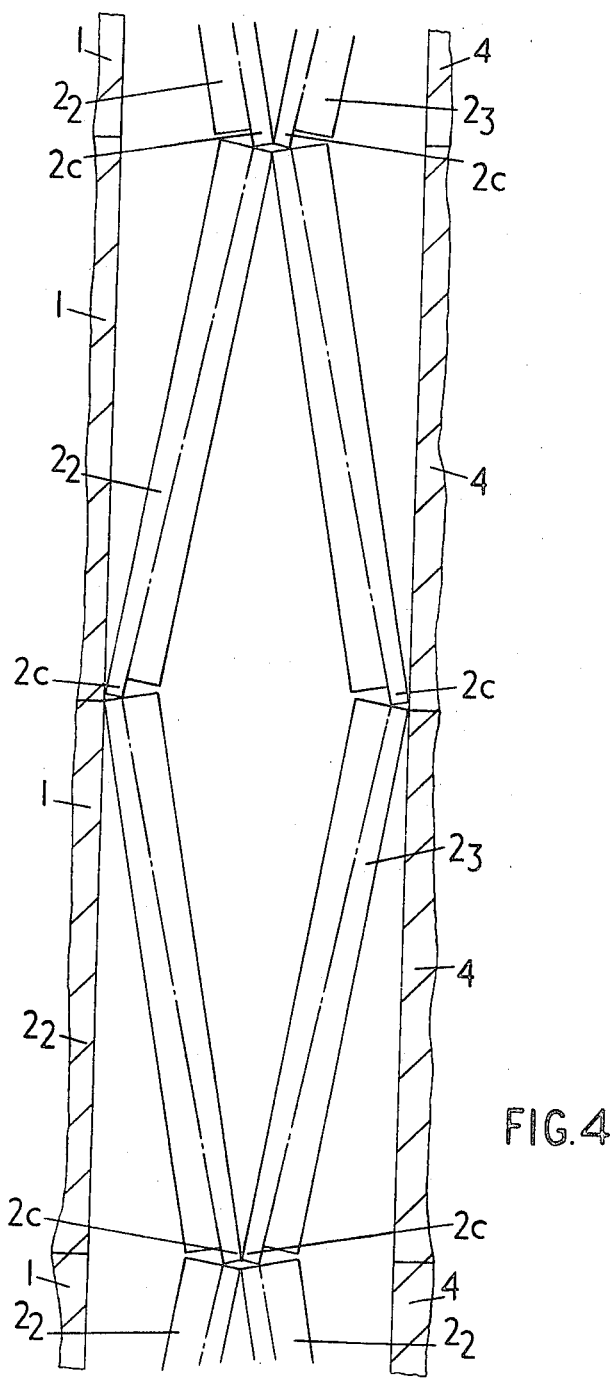
FIG. 4 is a diagrammatic view of part of an assembly in accordance with the invention showing in exaggerated form the positions which the nuclear fuel containing members tend to take up.

As mentioned earlier the members are shown displaced in an exaggerated manner in FIG. 4. In practice the members will be substantially vertical but the couples acting thereon are such as to resist forces tending to vibrate the members.

Whilst in the above example fuel elements having graphite sleeves have been described, the use of graphite for the sleeves is not essential and other low neutron absorbing material such as silicon carbide can be used. The nuclear fuel-containing member may be of graphite or other low neutron absorbing material.

A fuel element assembly such as that described, whilst particularly suitable for gas-cooled graphite moderated reactors, can be used in any reactor where the fuel element assembly is located in vertical channels through which a cooling fluid is circulated.

In the form described each cluster comprises a plurality of groups of fuel-containing members but this is not essential. In some circumstances a cluster may comprise only one group of members said group containing any number of members. It is not essential for each group to have the same number of fuel-containing members.

In the embodiments described a nuclear fuel-containing member is shown as a single member housing nuclear fuel but the term is used to include arrangements in which each member comprises a number of separate elements each containing nuclear fuel and each having a similar off-set projection so that all the elements of a member tend to lean in the same direction.

We claim:

1. A nuclear reactor fuel element assembly including a plurality of sleeves disposed in end-to-end relationship with one another, a plurality of nuclear fuel-containing members, each member having end faces, at least two axially spaced clusters of said nuclear fuel-containing members being disposed within said sleeves with said fuel-containing members of one cluster being supported by said fuel-containing members of a cluster immediately below it with adjacent end faces of said members in engagement, said fuel-containing members of each cluster defining at least one group, said group being coupled with said fuel-containing members of a corresponding group of the cluster next below, and wherein for each pair of engaging end faces of adjacent fuel-containing members, engagement means are disposed on at least one end face, said engagement means being offset in position wherein a vertical line joining the center of gravity of one member to the adjoining end faces passes outside the area of contact between the two end faces, whereby said fuel-containing members of the groups are so disposed that gravitational forces due to the weight of the fuel-containing members of the group when the assembly is located in a vertical channel in a reactor core, act to produce couples on the members causing them to lean at one end towards one another in mutually supporting relationship and to lean at the other end away from one another against fixed surfaces defined at least in part by the walls of the sleeves, the couples acting on adjoining faces of fuel-containing members of corresponding groups in adjacent clusters causing all the members of both groups to lean in the same manner with respect to one another at the adjoining faces.

2. A fuel element assembly according to claim 1, wherein the fuel-containing member are located in groups in an annular space formed between the sleeves and a centrally located member, said sleeves having walls, those ends of the members of a group leaning away from one another contacting and being supported by said walls of the sleeves and contacting and being in mutually supporting relationship with fuel-containing members of other groups of the cluster via said centrally located member.

3. A fuel-element assembly according to claim 1, wherein each member is fuel-element with lug-means engaging with engagement means on adjacent members of the group, thereby preventing relative rotation between members of the group.

4. A fuel element assembly according to claim 3, wherein the lug means also engage means on the sleeves.

5. A fuel element assembly according to claim 3, wherein the lug means serve as spacing means between adjacent fuel-containing member of a cluster.

* * * * *